(12) United States Patent
Specht

(10) Patent No.: US 6,695,243 B2
(45) Date of Patent: Feb. 24, 2004

(54) SEAT BELT RETRACTOR WITH HYDRAULIC LOAD LIMITING

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 4 days.

(21) Appl. No.: 10/259,518

(22) Filed: Sep. 30, 2002

(65) Prior Publication Data

US 2003/0192977 A1 Oct. 16, 2003

(30) Foreign Application Priority Data

Apr. 16, 2002 (DE) .......................... 102 16 862

(51) Int. Cl.[7] .............................. B60R 22/28
(52) U.S. Cl. .................... 242/379.1; 242/381; 297/470
(58) Field of Search ................... 242/379.1, 381, 242/390.8–390.9; 297/470; 280/805

(56) References Cited

U.S. PATENT DOCUMENTS

| | | | | |
|---|---|---|---|---|
| 3,901,345 A | | 8/1975 | Fieni | 180/91 |
| 6,019,392 A | * | 2/2000 | Karlow | 280/806 |
| 6,241,172 B1 | * | 6/2001 | Fugel et al. | 242/379.1 |
| 6,290,159 B1 | | 9/2001 | Specht et al. | 242/379.1 |
| 2002/0134877 A1 | | 9/2002 | Glinka | 242/379.1 |

FOREIGN PATENT DOCUMENTS

| | | |
|---|---|---|
| DE | 2238169 | 2/1974 |
| DE | 4342666 | 6/1994 |
| DE | 19959956 A1 | 6/2001 |
| DE | 19963580 | 8/2001 |
| DE | 19963580 C2 | 11/2001 |
| DE | 10034393 A1 | 1/2002 |
| EP | 0629531 | 6/1994 |
| EP | 0778182 | 12/1996 |
| GB | 2314755 A | 1/1998 |

* cited by examiner

Primary Examiner—Kathy Matecki
Assistant Examiner—Sang K Kim
(74) Attorney, Agent, or Firm—Lonnie Drayer

(57) ABSTRACT

A seat belt retractor has a belt reel rotatably mounted in a frame. A blocking means blocks rotation of a blockable part of the belt reel and a belt webbing carrier on the belt reel that is substantially drum-shaped. The belt webbing carrier is associated with a rotor that is in rotary drive connection with the belt webbing carrier. Upon rotation of the rotor the volumes of at least two chambers filled with a free-flowing medium are varied, and the chambers rotate about the axis of rotation of the belt reels. The free-flowing medium flows in each case from a chamber diminishing in volume into a chamber increasing in volume.

16 Claims, 5 Drawing Sheets

SEAT BELT RETRACTOR WITH HYDRAULIC LOAD LIMITING

FIELD OF THE INVENTION

The invention relates to a seat belt retractor with hydraulic load limiting.

DISCUSSION OF THE PRIOR ART

A known seat belt retractor comprises a belt reel for the seat belt and a blocking means for blocking rotation of a blockable part of the belt reel. The known seat belt retractor further comprises a load limiter, which consumes energy when the blocking means is activated and when the belt webbing carrier is rotated in the belt take-off direction relative to the blocked part of the belt reel. A load limiter is known from DE 199 63 580 C2 which comprises a cylinder filled with a viscous fluid, in which a piston is moved linearly with an opening comprising a variable flow cross-section as a flow path.

SUMMARY OF THE INVENTION

There is provided in accordance with the present invention A seat belt retractor comprising a frame with a belt reel having an axis of rotation rotatably mounted in the frame, a blocking means for blocking rotation of a blockable part of the belt reel, and a substantially drum-shaped belt webbing carrier on the belt reel, wherein in the belt webbing carrier there is arranged a rotor that is in rotary drive connection with the belt webbing carrier, the belt webbing carrier drives a toothed outer rotor and the rotor comprises a toothed inner rotor, wherein chambers filled a free-flowing medium are formed by intermeshing teeth of the outer rotor and the inner rotor and upon rotation of the rotor the volumes of at least two chambers filled with the free-flowing medium are varied, wherein the chambers rotate about the belt reel axis, and in the free-flowing medium flows in each case from a chamber diminishing in volume into a chamber increasing in volume.

DETAILED DESCRIPTION OF THE INVENTION

Figure 1:
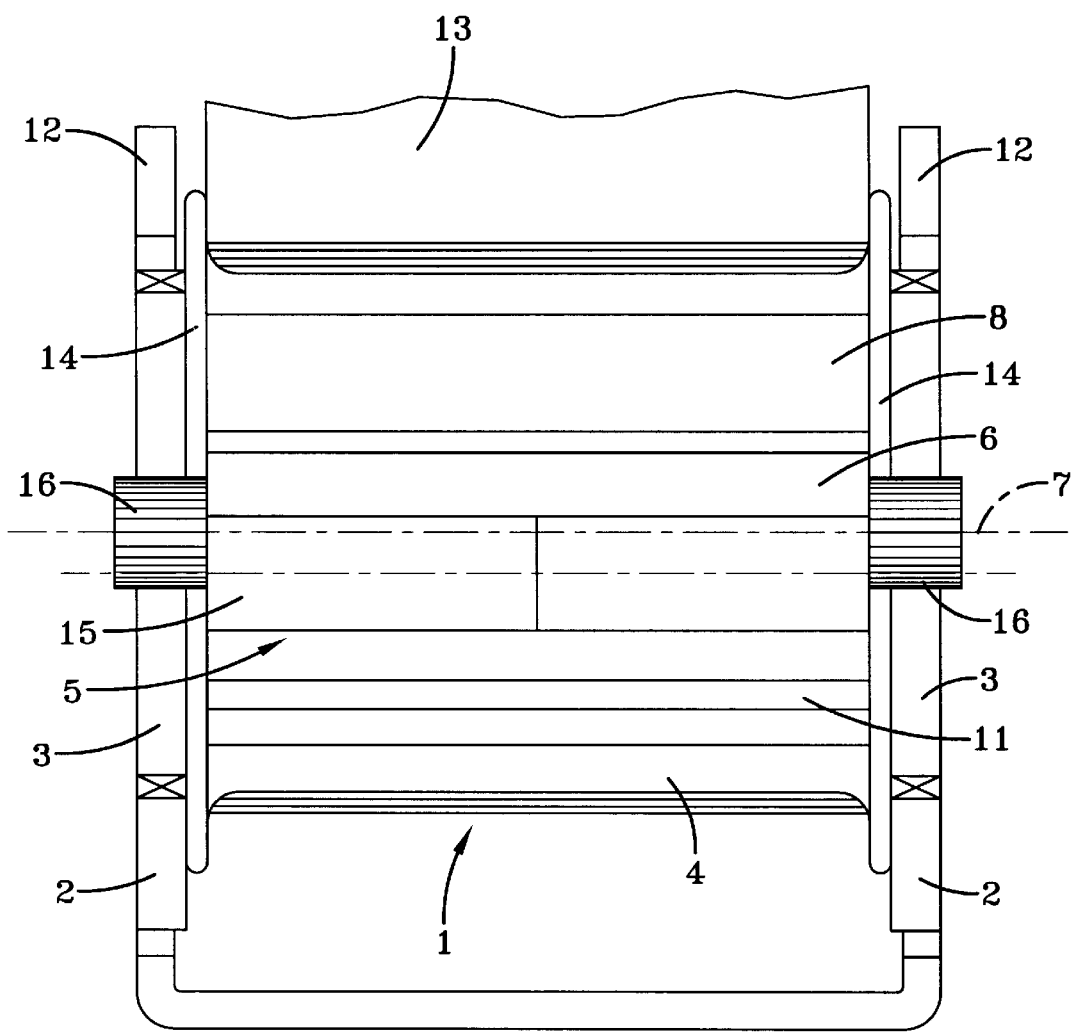
FIG. 1 is a longitudinal section through an exemplary embodiment of a seat belt retractor, illustrating the components necessary for an understanding of the invention.

FIG. 1 is a longitudinal section through an exemplary embodiment of a seat belt retractor according to the present invention, illustrating the components necessary for an understanding of the invention. The seat belt retractor illustrated has a belt reel 1, which is mounted rotatably in a frame 12. The belt reel 1 comprises a substantially drum-shaped belt webbing carrier 4, onto which seat belt webbing 13 may be wound and unwound. A blocking means 2, which may for example take the form of a catch means mounted movably on the frame 12, allows the belt reel 1 to be blocked against rotation. To this end, the blocking means 2 engages a blockable part of the belt reel 1. This blockable part may take the form of a toothed disk, or disks, arranged on one side or both sides of the belt reel 1. In the normal operating state, the at least one toothed disk (blockable part 3) is connected non-rotatably with the belt webbing carrier 4, for example via shearing pins (not described in any more detail) or by frictional engagement with the belt webbing carrier 4 of the belt reel 1. The inside of the belt webbing carrier 4 is closed in a fluid-tight manner by end disks 14. A rotor 5 is located inside the belt webbing carrier 4. The rotor includes an axle 15 mounted eccentrically relative to the belt reel axis 7, on which axle 15 a toothed inner rotor 11 is mounted rotatably eccentrically relative to the belt reel axis 7. The eccentric mounted axle 15 is mounted about the belt reel axis 7 inside the belt reel 1 for example on the end disks 14 or axle journals 16 connected firmly with the blockable parts 3, so as to be rotatable about the belt reel axis 7.

Figure 2:
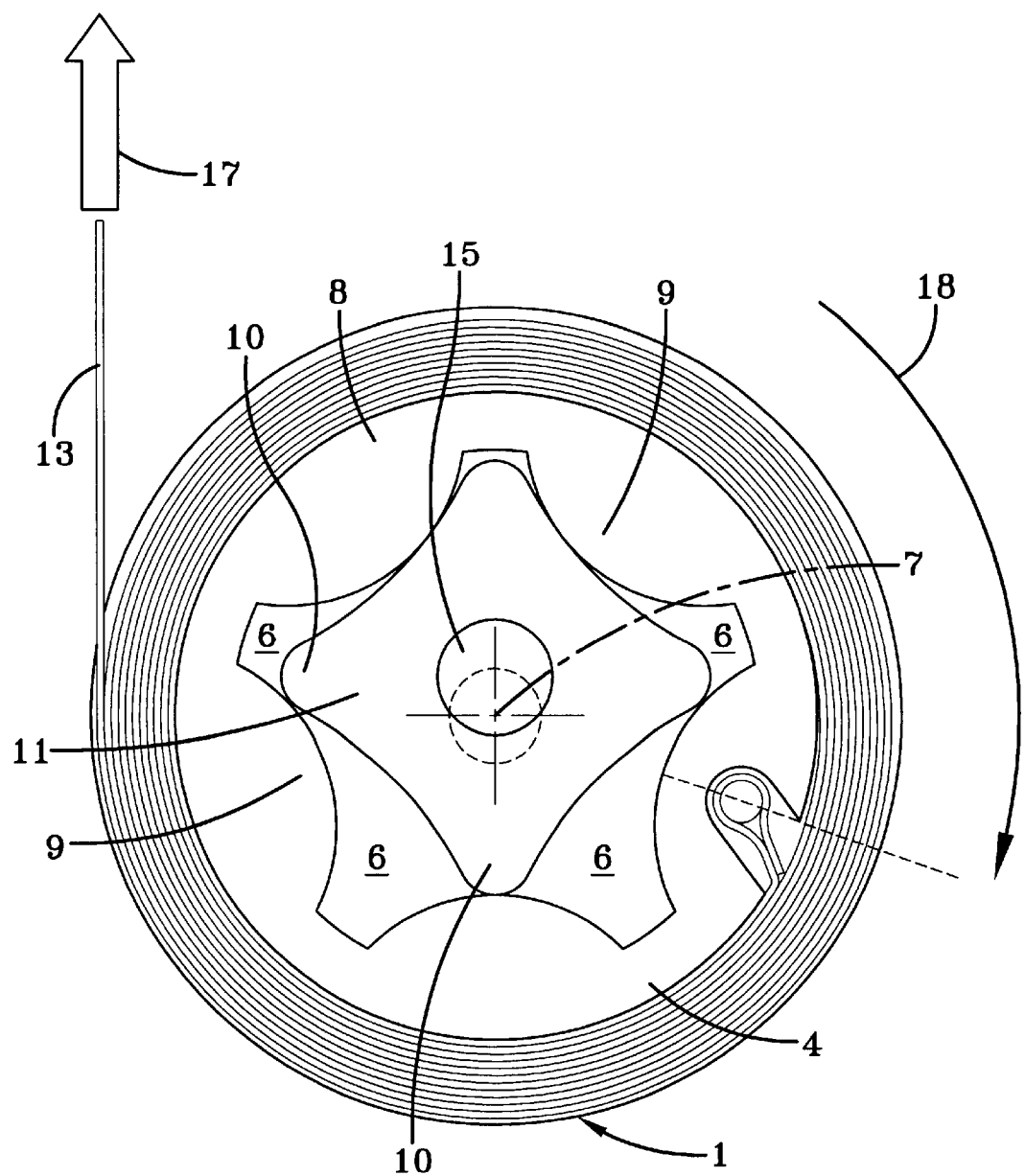
FIG. 2 is a cross-section through the exemplary embodiment illustrated in FIG. 1 in a first operating position.

FIG. 2 is a cross-section through the exemplary embodiment illustrated in FIG. 1 in a first operating position. To achieve joint rotation of the belt webbing carrier 4 and the rotor 5, both in the case of the load-limiting function and in the case of torque transmission (coupling function), the rotor preferably takes the form of a toothed inner rotor 11, as in the case of a rotor set of an internal axis rotary piston machine, wherein the teeth of the inner rotor engage the toothed outer rotor 8. The outer rotor is in rotary drive connection with the belt webbing carrier and may preferably be rigidly connected therewith. The teeth 9 of an outer rotor 8 may move into rotary drive connection with the teeth 10 of the inner rotor 11. The outer rotor 8 is in rotary drive connection with the belt webbing carrier 4. The toothed outer rotor 8 is preferably connected in a torsionally rigid manner with the belt webbing carrier 4 or is formed in one piece therewith.

The seat belt retractor according to the invention may be so constructed that the nested arrangement of belt webbing carrier, rotor and the medium filling the chambers formed has a load-limiting function or a coupling function or both. The in particular free-flowing medium filling the chambers preferably takes the form of a fluid of adjustable viscosity. An electro- and/or magneto-rheological fluid is particularly suitable for this purpose. Between the teeth 9, 10, which extend over the entire length of the inner chamber between the two end disks 14 of the belt reel 1 there are formed chambers 6, which are filled with a fluid or free-flowing medium. The free-flowing medium preferably is a fluid of adjustable viscosity.

The toothed inner rotor and outer rotor arrangement forms the rotor set of an internal axis rotary piston pump, in particular a gear pump of he type distributed by the Hydraulics Division of Eaton Corporation of Eden Prairie, Minn., U.S.A., sometimes referred to simply as an Eaton pump. With the arrangement described, two functions may be performed, namely that of a load limiter and that of a coupling, with which a torque acting applied from outside is transmitted via the rotor 5 and the medium arranged in the chambers 6 to the belt reel carrier.

When a motor vehicle in which the seat belt retractor is installed is traveling normally, the blockable parts (toothed disks) 3 of the belt reel 1 co-rotate during winding and unwinding of the belt webbing 13. The components arranged inside the belt reel 1 also co-rotate about the belt reel axis 7.

In the event of excessive acceleration acting on the sensor means of the seat belt retractor, for example in a crash, the blocking means 2 engages the blockable parts 3 of the belt reel 1. This engagement may take place in such a way that a drive movement generated by a tightening drive may be transmitted to the belt reel 1. Moreover, this engagement may take place when the belt webbing 13 has been wound onto the belt webbing carrier 4 by a tightening drive, which is not shown in any more detail in FIG. 1.

Figure 3:
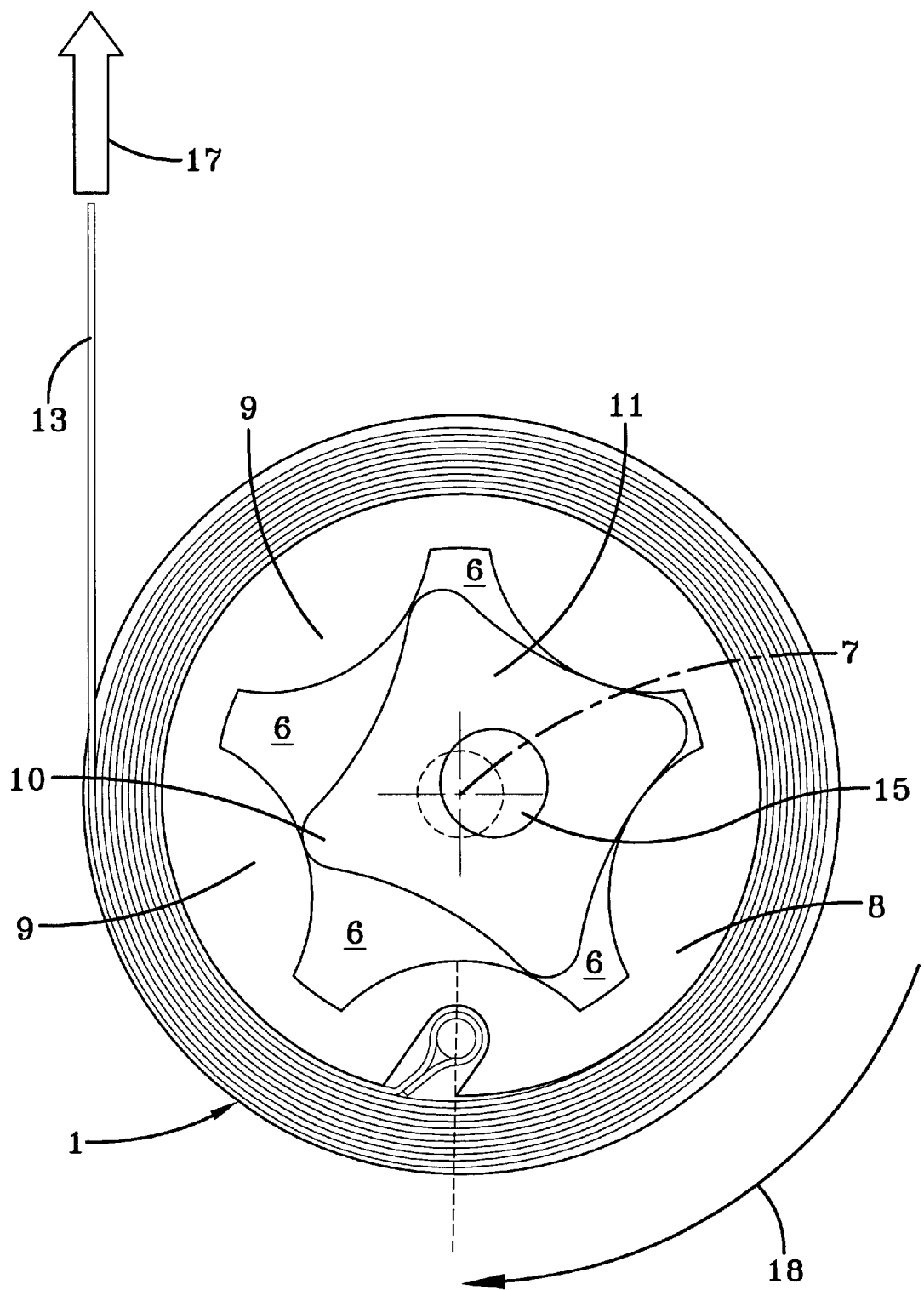
FIG. 3 is a cross-section through the exemplary embodiment in a second operating position.
Figure 4:
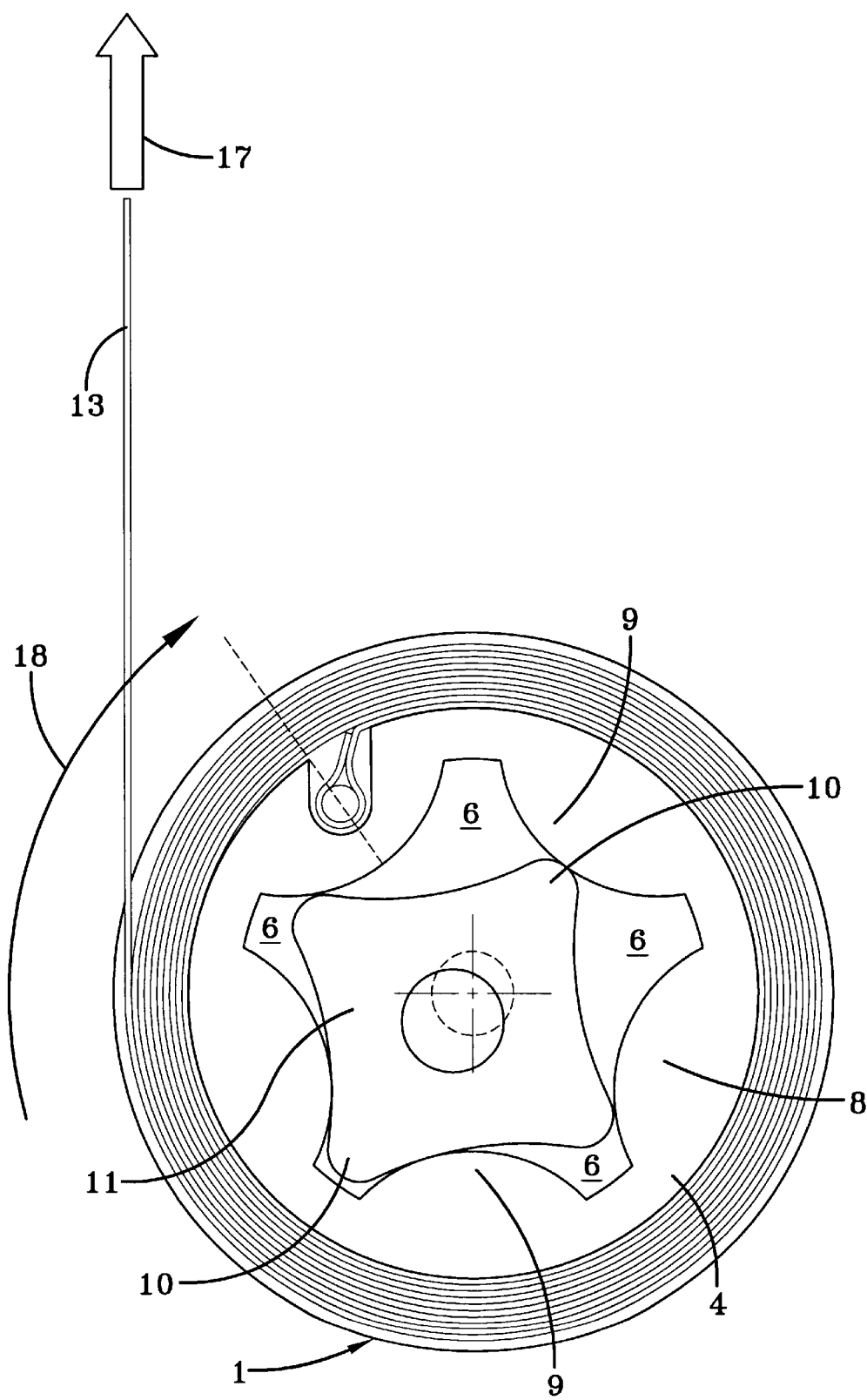
FIG. 4 is a cross-section through the exemplary embodiment in a third operating position.

If, in the event of forwards displacement of a seat-belted vehicle occupant, a force threshold is exceeded, the load-limiting function, which is integrated into the belt reel 1, comes into effect. To this end, the non-interlocking contact fit between the blockable part 3 of the belt reel 1 and the belt webbing carrier 4, which is produced by shearing pins or by frictional engagement and the like during normal travel, is interrupted. When the belt webbing 3 is taken off (the belt take-off direction is indicated by an arrow 17), the belt webbing carrier 4 is rotated. This rotary motion is transmitted to the outer rotor 8, and the inner rotor 11 engaging with its teeth 10 in the teeth 9 of the outer rotor 8 is co-rotated. As is clear from FIGS. 2 to 4, the inner rotor 11 has a smaller number of teeth than the outer rotor 8. In the exemplary embodiment illustrated, in which the outer rotor and inner rotor are constructed in the manner of a rotor set of an Eaton pump, the inner rotor 11 has four teeth and the outer rotor 8 has five teeth. The inner rotor 11 thus exhibits a rotational speed 5/4-times higher than that of the outer rotor 8. Due to these different rotational speeds, the volumes of the chambers 6 formed between the teeth 9 and 10 vary, progressively in the direction of rotation, as is clear from FIGS. 2 to 4. The direction of rotation in the webbing take-off direction 17 is indicated by an arrow 18 (in the clockwise direction) in FIGS. 2 to 4. This rotary motion may proceed without restriction, however a limit stop for limiting the rotary motion and thus the webbing take-off length may also advantageously be reached.

During the relative rotation of the inner rotor 11 relative to the outer rotor 8, the free-flowing medium is transported out of the chambers 6, in which the volume is reduced thereby compressing the free-flowing medium located in these chambers, into the in each case adjacent chamber increasing in volume. This may proceed in that the free-flowing medium is forced through the respective gap, which is formed between the teeth 9, 10 of the outer and inner rotors, or in that additional channels are provided in the teeth 9 and/or 10 of the outer rotor 8 and the inner rotor 11, which is shown in broken lines in FIGS. 2 to 4. The overflow channels in the teeth 9 and 10 may also extend diagonally in particular in the inner rotor 11.

When the free-flowing medium is transported from one chamber to the other, energy is consumed, which effects a reduction and/or restriction of the force exerted by the seat belt webbing on the seat-belted vehicle occupant.

Figure 5:
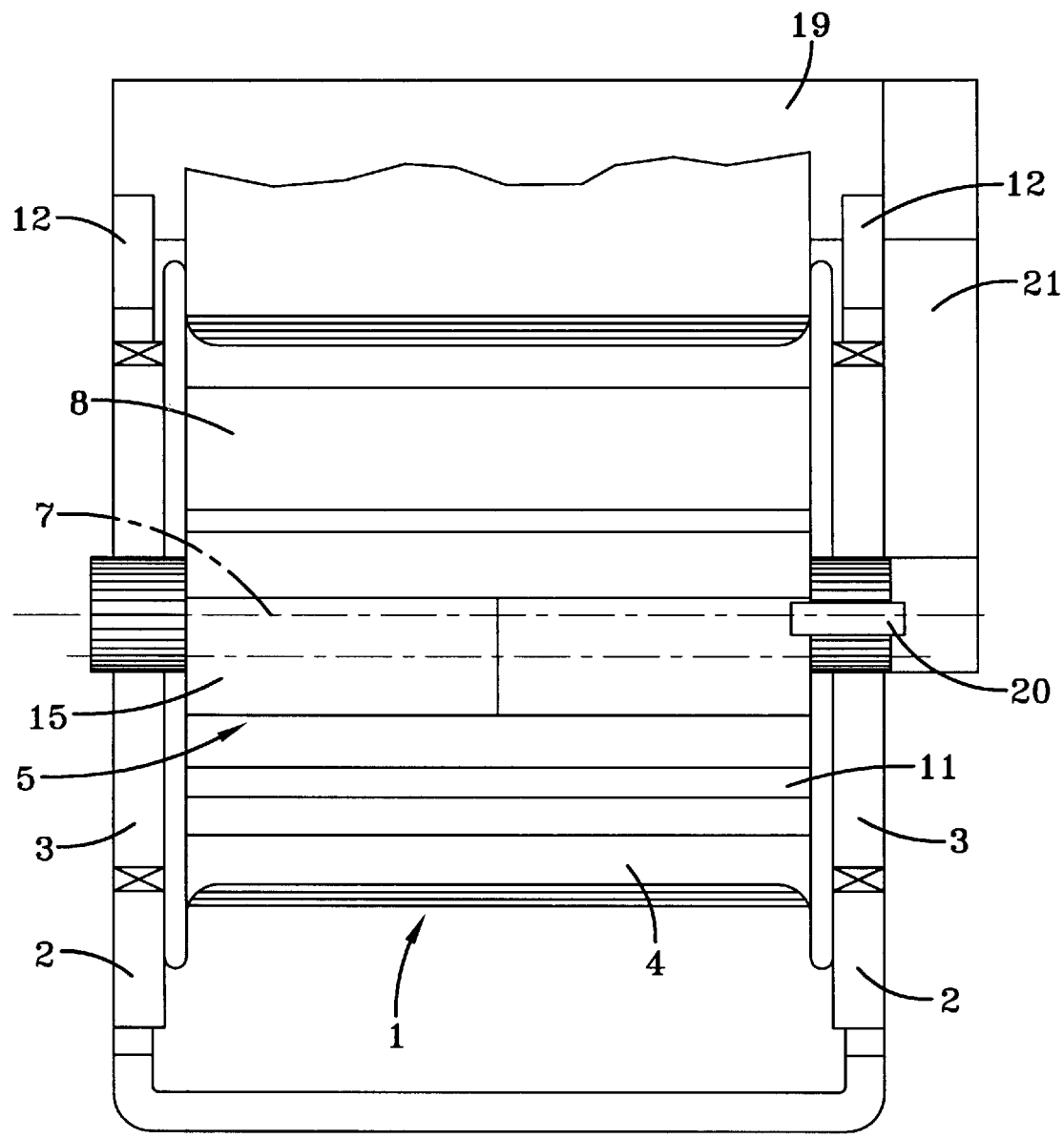
FIG. 5 is a longitudinal section of a further exemplary embodiment.

In the exemplary embodiment shown in FIG. 5, a torque may be applied from outside to the rotor 5, in particular the axle 15. This torque may be generated by an electrical drive 19, in particular an electric motor. The torque is transmitted via gearing 21 to a drive shaft 20 extending through the axle journal 16, which drive shaft 20 is preferably connected rigidly with the axle 15. The drive shaft 20 extends coaxially with the belt reel axis 7. FIG. 5 shows a torque introduced on one side. The torque may however also be introduced into the rotor 5, in particular the axle 15, on both sides. This torque may serve to tighten the belt webbing 13, wherein the direction of rotation, which is transmitted to the belt webbing carrier 5, is directed in the belt winding direction (opposite direction to the belt take-off direction 17). To this end, the viscosity of the free-flowing medium located in the chambers 6 is so adjusted that the torque is transmitted from the rotor, via the medium located in the chambers 6 to the outer rotor 8. To this end, the viscosity of the medium is so adjusted that a virtually rigid connection is produced due to the greatly reduced flowability of the medium between the rotor 5 and the belt webbing carrier 4.

It is however also possible to adjust the load-limiting effect, which has been explained above, by means of the torque applied from outside to the rotor. At the same time, the viscosity of the medium located in the chambers 6 may to this end be adjusted in such a way that a damped effect, additive or subtractive depending on direction of rotation, of the torque acting from outside on the belt webbing carrier 4 is achieved.

For this purpose, the medium located in the chambers 8 preferably takes the form of an electro- and/or magneto-rheological fluid. The electrical field and/or magnetic field may be caused to act on the electro- and/or magneto-rheological fluid located in the chambers 6, preferably via the inner rotor 11 and the outer rotor 8, which form corresponding poles by means of an externally generated electrical field or magnetic field, which is generated for example by means of an electromagnet, not described in any more detail, provided on the frame 12. Instead of the electrical drive, tightening may also be performed using a pyrotechnic or mechanical tightening drive for driving the drive shaft 20.

The electrical drive 19 may be used both for pretightening and for power-tightening in the event of appropriate adjustment of the viscosity of the medium located in the chambers 6.

Although the invention has been described and illustrated in detail, it is to be understood that the detail provided is by way of example and illustration, is not to be considered a limitation, and that modifications and changes therein may be made by those skilled in the art without departing from the spirit and scope of the invention. Accordingly, the scope of this invention is to be limited only by the appended claims.

I claim:

1. A seat belt retractor comprising a frame with a belt reel having an axis of rotation rotatably mounted in the frame, a blocking means for blocking rotation of a blockable part of the belt reel, and a substantially drum-shaped belt webbing carrier on the belt reel, wherein the belt webbing carrier is arranged with a rotor that is in rotary drive connection with the belt webbing carrier, the rotor being mounted eccentrically relative to the belt reel axis, the belt webbing carrier drives a toothed outer rotor and the rotor comprises a toothed inner rotor, wherein chambers filled a free-flowing medium are formed by intermeshing teeth of the outer rotor and the inner rotor and upon rotation of the rotor the volumes of at least two chambers filled with the free-flowing medium are varied, wherein the chambers rotate about the belt reel axis, and the free-flowing medium flows in each case from one chamber diminishing in volume into another chamber increasing in volume.

2. The seat belt retractor according to claim 1, wherein all the chambers filled with the free-flowing medium form a sealed unit.

3. The seat belt retractor according to claim 1, wherein the outer rotor is connected non-rotatably with the belt webbing carrier.

4. The seat belt retractor according to claim 1, wherein the outer rotor and the inner rotor take the form of a rotor set of an internal axis rotary piston machine.

5. The seat belt retractor according to claim 1, wherein the free-flowing medium is a fluid of adjustable viscosity.

6. The seat belt retractor according to claim 1, wherein the free-flowing medium is an electro-rheological fluid.

7. The seat belt retractor according to claim 6, wherein the rotor may be acted upon by an externally acting torque, which may be transmitted to the belt webbing carrier via the free-flowing medium, the viscosity of which is adjusted in such a way that a virtually rigid connection is produced due to a greatly reduced flowability of the medium between the rotor and the belt webbing carrier.

8. The seat belt retractor according to claim 7, wherein the externally acting torque is generated by an electric motor.

9. The seat belt retractor according to claim 1, wherein the free-flowing medium is a magneto-rheological fluid.

10. The seat belt retractor according to claim 9, wherein the rotor may be acted upon by an externally acting torque, which may be transmitted to the belt webbing carrier via the free-flowing medium, the viscosity of which is adjusted in such a way that a virtually rigid connection is produced due to a greatly reduced flowability of the medium between the rotor and the belt webbing carrier.

11. The seat belt retractor according to claim 10, wherein the externally acting torque is generated by an electric motor.

12. The seat belt retractor according to claim 1, wherein the rotor may be acted upon by an externally acting torque, which may be transmitted to the belt webbing carrier via the free-flowing medium, the viscosity of which is adjusted in such a way that a virtually rigid connection is produced due to a greatly reduced flowability of the medium between the rotor and the belt webbing carrier.

13. The seat belt retractor according to claim 12, wherein the externally acting torque is generated by an electric motor.

14. The seat belt retractor according to claim 1, wherein, an energy-consuming load limiter is formed by the rotor and the medium flowing between the chambers when rotation of the blockable part of the belt reel is blocked and when the belt webbing carrier is rotated in a belt take-off direction.

15. The seat belt retractor according to claim 14, wherein the belt webbing carrier exhibits a different rotational speed from the rotor.

16. The seat belt retractor according to claim 15, wherein the rotor exhibits a higher rotational speed than the belt webbing carrier.

* * * * *